United States Patent [19]
Thomas et al.

[11] 3,744,782
[45] July 10, 1973

[54] TORSIONAL SHEAR DAMPED FOUNDATION MEMBER

[75] Inventors: Edward V. Thomas, Severna Park; Charles S. Longley, Annapolis, both of Md.

[73] Assignee: The United States of America as represented by the Secretary of the Navy, Washington, D.C.

[22] Filed: Apr. 25, 1972

[21] Appl. No.: 247,295

[52] U.S. Cl. ............................................. 267/154
[51] Int. Cl. ............................................. F16f 1/16
[58] Field of Search ...................... 267/154; 248/18, 248/15

[56] References Cited
UNITED STATES PATENTS

| 3,403,899 | 10/1968 | Plume | 267/154 |
| 3,504,904 | 4/1930 | Irwin et al. | 267/154 |

Primary Examiner—James B. Marbert
Attorney—R. S. Sciascia, Q. E. Hodges et al.

[57] ABSTRACT

The invention is a torsional shear damped foundation member to support a resilient mount on a non-directional loading device which causes a visco-elastic cylinder to support a load in static shear and to provide a high dynamic loss factor in dynamic shear.

1 Claim, 1 Drawing Figure

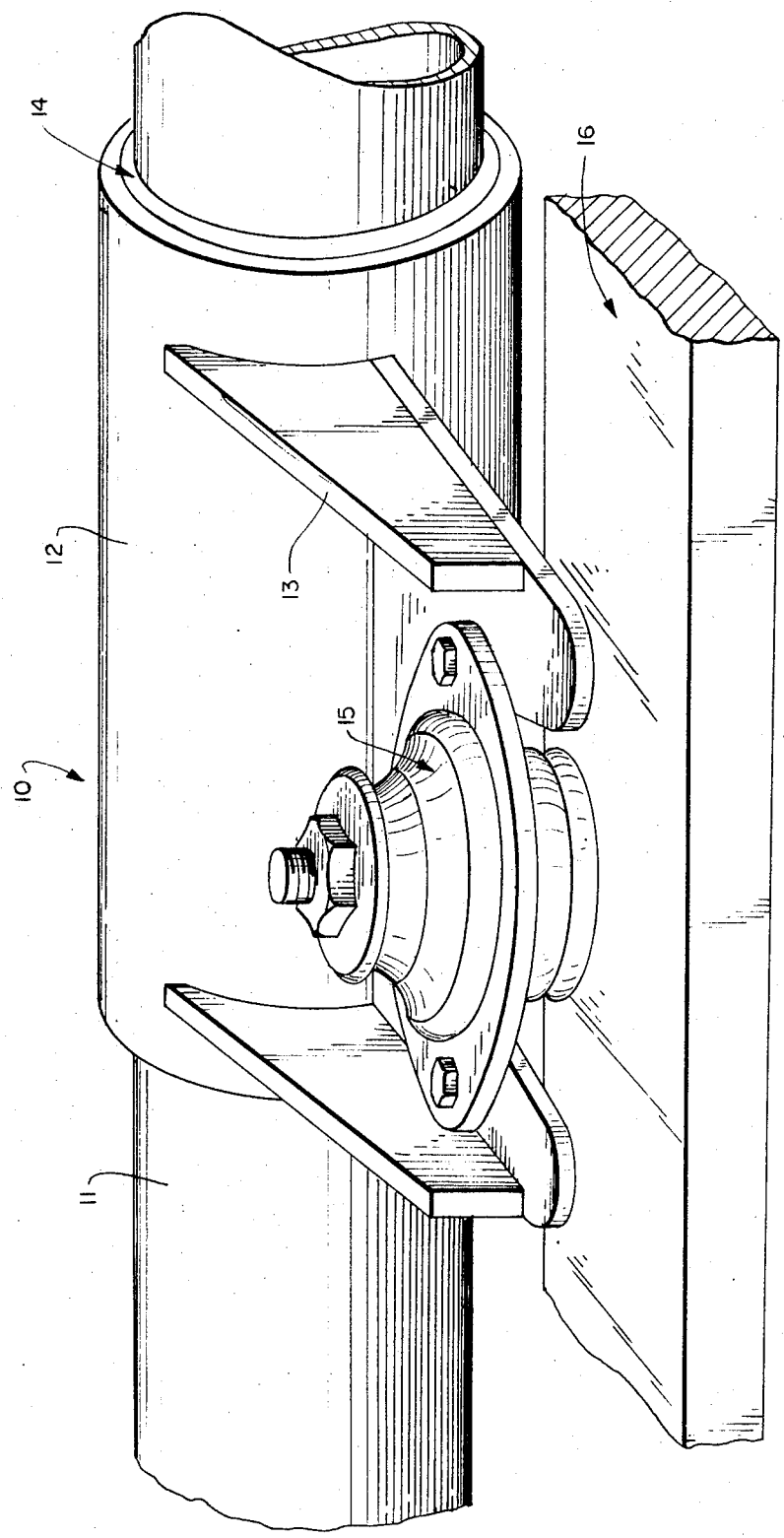

TORSIONAL SHEAR DAMPED FOUNDATION MEMBER

The invention described herein may be manufactured and used by or for the Government of the United States of America for Governmental purposes without the payment of any royalties thereon or therefor.

BACKGROUND OF THE INVENTION

It is desirable to keep vibrations to a minimum on ships and submarines because they are unpleasant to shipboard personnel and they are easily transmitted through the water and can be picked up and used by others to determine the position of the ship. Machinery aboard vessels often produces such undesirable vibration and noise and the transmission of such structure-borne vibrations to the ship's hull must be substantially reduced or eliminated. In existing machine foundation assemblies one type of structure can be used to isolate the machine vibrations and a separate structure can be employed to dampen machine vibrations. For example, resilient isolation mounts are placed between the machine and its support and damping materials are applied externally to the support components. The instant invention is to support a resilient mount on a non-directional loading device. The invention does not relate to a resilient shock or vibration isolation mount with damping characteristics but rather to the high impedance termination for such a mount.

SUMMARY OF THE INVENTION

The general purpose of the instant invention is to support a resilient mount on a non-directional loading device which causes a visco-elastic cylinder to support a load in static shear to provide a high dynamic loss factor in dynamic shear.

OBJECTS OF THE INVENTION

It is a primary object of the instant invention to provide a member to support a resilient mount, said member providing a high and relatively constant termination impedance to the resilient isolation mount thereon.

BRIEF DESCRIPTION OF THE DRAWING

The FIGURE shows the torsional shear damped foundation and an associated resilient mount.

DESCRIPTION OF THE PREFERRED EMBODIMENT

With continued reference to the drawing, the torsional shear damped foundation member 10 consists of an inner pipe member 11 which is fastened to other structural supports at its ends or along its length. Around inner pipe member 11 there is an outer pipe member 12 to which is affixed a load carrying arm 13. The outer pipe member 12 is affixed to inner pipe member 11 by a visco-elastic adhesive 14. The visco-elastic adhesive used has a high dynamic tangent shear loss which dissipates vibratory energy as heat. The member is constructed by forcing the visco-elastic material 14 into the annular cavity between the inner pipe and the outer pipe with end constraints. The visco-elastic material 14 is secured in place and bonds the inner and outer pipe surfaces. Load carrying arm 13 is connected by a conventional resilient isolation mount 15 to machine sub-base or foot 16. The visco-elastic material is composed of a two-part, self-setting, room temperature curing compound, such as Miracle Adhesives Corporation Type CA-40 Flexible Epoxy-Lead Filled Resin which has a durometer hardness between 60 and 80 at 75° F. The resilient shock and vibration isolation mount 15 is a high compliance element whose performance is dependent upon the ratio of mechanical impedance of the mount, with the mechanical impedance of the termination. The instant invention furnishes a high and relatively constant termination impedance to the resilient isolation mount thereon. This high constant termination impedance greatly enhances the isolation effectiveness of the resilient isolation mount. In addition to enhancing the performance of the isolation mount 15 at foundation resonance, the vibrational energy transmitted by the isolation mount to the foundation is additionally reduced in level by the damping due to the torsional shear damped foundation member. Thus a double gain in reduction of vibrational energy transmitted to the terminating structure at foundation resonance is obtained through the use of this damped member in conjunction with the isolation mount 15. As a result, the torsional shear damped foundation member has advantages that all static loads are carried in torsional shear, all directions of dynamic load are carried in axial or torsional shear which is the most efficient deformation for vibration attenuation, under shock loading the pulse shock is retarded in time by the visco-elastic material which attenuates machinery shock, and finally, the member is entirely elastically constrained under high shock loading and deformation limited to visco-elastic thicknesses.

It is understood that the invention is not limited to the exact details of construction shown and described for obvious modifications will occur to persons skilled in the art. It is therefore to be understood that within the scope of the appended claim the invention may be practiced otherwise than as specifically described.

What is claimed is:
1. A torsional shear damped foundation member comprising:
   a first pipe member adapted to be connected to structural supports;
   a second pipe member mounted concentrically around said first pipe member;
   a load arm connected at one end to said second pipe substantially perpendicular to the longitudinal axis of said second pipe, said load arm being adapted to carry a load at its other end;
   a visco-elastic adhesive within the annular cavity between said first and second pipe members to bond them together.

* * * * *